Aug. 6, 1963  L. DAVIDSON  3,099,969
LOAD BEARING INDUSTRIAL PALLET
Filed Dec. 28, 1959  2 Sheets-Sheet 1
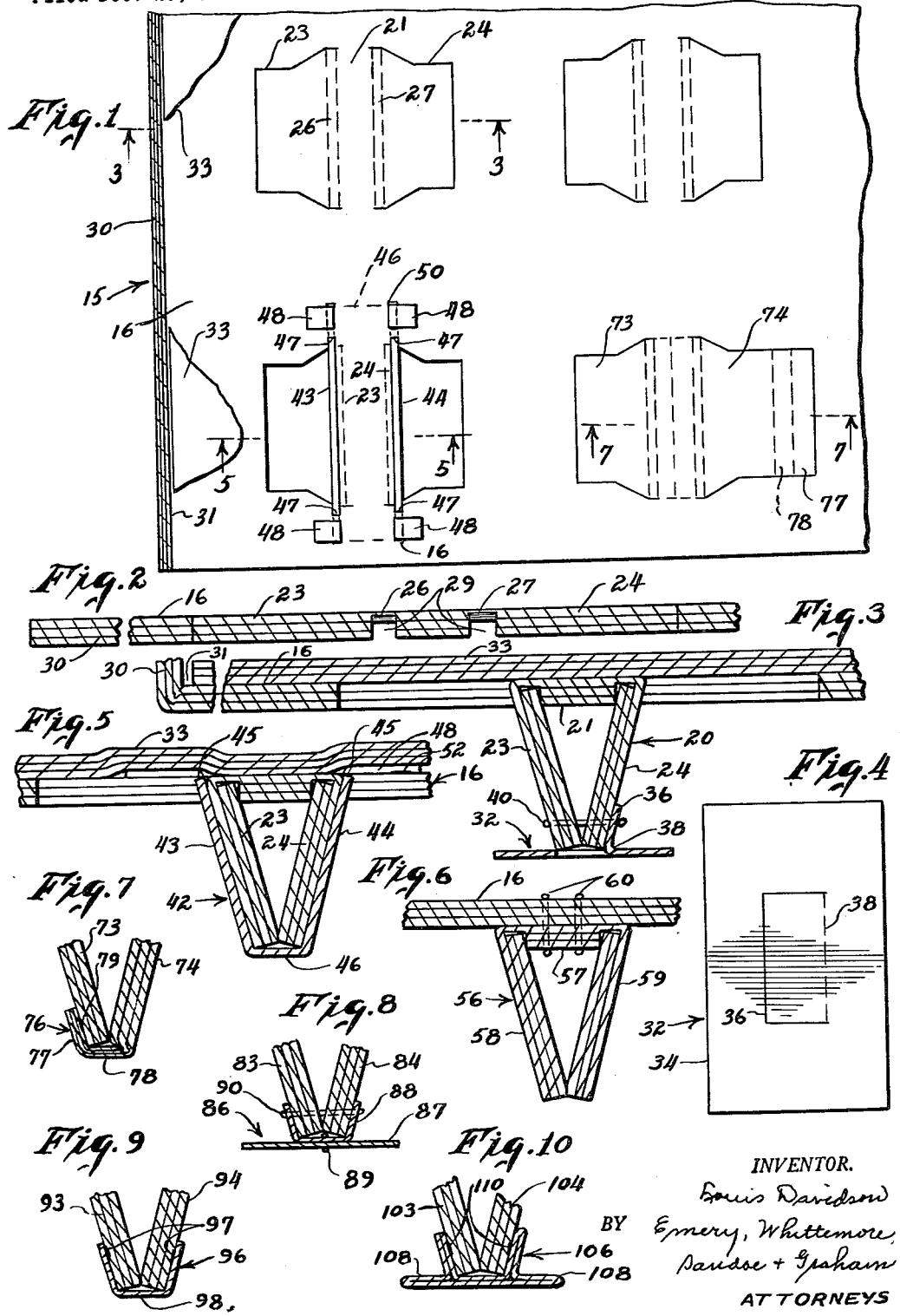
INVENTOR.
Louis Davidson
BY Emery, Whittemore,
Sandoe + Graham
ATTORNEYS Aug. 6, 1963 L. DAVIDSON 3,099,969
LOAD BEARING INDUSTRIAL PALLET
Filed Dec. 28, 1959 2 Sheets-Sheet 2
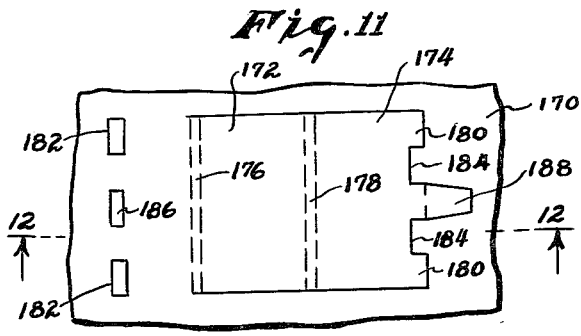
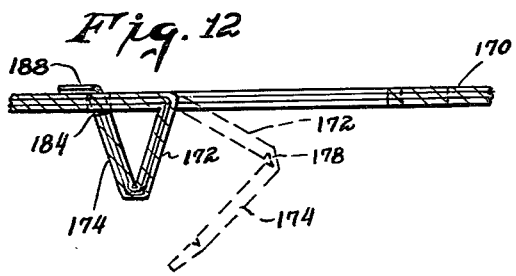
INVENTOR.
Louis Davidson
BY Emery, Whittemore
Pardoe & Graham
ATTORNEYS : 3,099,969
Patented Aug. 6, 1963

3,099,969
LOAD BEARING INDUSTRIAL PALLET
Louis Davidson, 24 Waterview Road, Oceanside, N.Y.
Filed Dec. 28, 1959, Ser. No. 862,138
7 Claims. (Cl. 108—56)

This invention relates to industrial pallets and more especially to pallets which are so constructed that they can be made of material such as corrugated paperboard, solid fiberboard, plastic, metal or combinations of these materials.

One object of the invention is to provide a pallet construction having a plurality of legs with each leg made of panels extending and converging downwardly, but constructed so as to obtain a larger bearing area for contact with an underlying support. One embodiment of the invention has a shoe assembly at the lower ends of the legs, and others have panels of the legs folded in such a way as to increase the area of contact. This construction can be made with shoe assemblies that increase the bearing areas of the legs to any desired extent for pallets that are to be stacked on the loads of underlying pallets. Such a construction is especially useful where the pallets are employed for carrying stacks of boxes, and two or more loaded pallets are stacked upon one another for shipping or storage.

Another object is to increase the strength of the pallet legs. This is done by increasing the width of the legs and tending them under imperforate areas of the platform.

Other objects, features and advantages of the invention will appear or be pointed out as the description proceeds.

In the drawing, forming a part hereof, in which like reference characters indicate corresponding parts in all the views:

FIGURE 1 is a fragmentary top plan view of a pallet having legs constructed in accordance with this invention;

FIGURE 2 is an enlarged sectional view through the pallet of FIGURE 1 on the line 3—3 of FIGURE 1 but before the leg and end panels are bent into angular relation in the pallet platform;

FIGURE 3 is an enlarged sectional view taken on the line 3—3 of FIGURE 1 showing the panels in set-up position;

FIGURE 4 is an enlarged top plan view of the shoe assembly, shown in FIGURE 3, before the tab of the shoe assembly has been bent upwardly;

FIGURE 5 is a view similar to FIGURE 3, but showing a modified construction, the section being taken on the line 5—5 of FIGURE 1;

FIGURE 6 is a sectional view, similar to FIGURE 3 but showing a modified construction in which the leg is a different piece from the pallet platform;

FIGURE 7 is a fragmentary sectional view, showing another modified construction, the section being taken on the line 7—7 of FIGURE 1;

FIGURES 8—10 are other fragmentary sectional views showing modified constructions for the lower ends of the legs;

FIGURE 11 is a fragmentary top plan view of a pallet with still another modified construction for forming a leg from the material of the pallet platform; and FIGURE 12 is a sectional view taken on the line 12—12 of FIGURE 11 but with the leg in set-up condition.

FIGURE 1 shows a pallet 15 having a platform 16 with a plurality of spaced legs for supporting it from an underlying surface. All of these legs may be of similar construction, but in the drawing different legs are made with different constructions so as to illustrate various modifications of the invention.

The preferred construction is shown in the upper left-hand portion of the platform 16, and this construction is shown in section in FIGURES 2 and 3. A leg 20 is formed with a center portion 21 which constitutes a part of the load-bearing area of the platform 16. The leg has two panels 23 and 24 formed of the material of the platform by cutting through the material along the solid lines shown in FIGURE 1.

These panels 23 and 24 remain connected to the platform, and more especially to the center portion 21, along hinge lines 26 and 27.

In order to facilitate the bending of the panels 23 and 24 downwardly and inwardly toward their lower ends, the material of the platform 16 is cut part way through at the hinge lines 26 and 27, and material is crushed or removed from the bottom face of the platform 16 at the hinge lines to provide clearance for the upper parts of the panels 23 and 24 as the panels swing angularly about the hinge lines 26 and 27, respectively. The regions from which material is crushed or removed are indicated by the reference characters 29 in FIGURE 2.

In order to make the pallet 15 suitable for use with the loads made up of odd, random or small size pieces, the pallet can be constructed as a tray or box. FIGURE 2 shows a panel 30 which can be folded upwardly along a hinge line 31, to form a side of the pallet, as shown in FIGURES 1 and 3. A side wall panel 30 can be provided along three sides of the platform to make the platform the bottom of a bin, or on four sides to make the platform the bottom of a box.

When the pallet is to be used for small pieces, that might fall through the openings left by the displacement of the panels 23 and 24, and other panels, from the platform 16, a panel 33 is used to cover the opening in the platform as shown in FIGURES 3 and 5.

The panels 23 and 24 are displaced from the platform 16, and swung downwardly through an angle in excess of 90° so that these panels converge and have their free ends adjacent to one another at the bottom of the leg, as shown in FIGURE 3.

At the lower end of the leg 20, there is a shoe assembly 32 consisting of a preferably flat element 34 having a tab 36 displaced from it and bent upwardly at a hinge line 38. This tab 36 extends along one of the leg panels, and is shown along the leg panel 24 in FIGURE 3.

The shoe assembly is attached to the lower portion of the leg 20 by fastening means. The construction shown in FIGURE 3 has a staple 40 extending through the tab 36 and through the lower portions of both of the leg panels 23 and 24. Thus, the staple 40 not only attaches the shoe assembly to the lower end of the leg 20, but it also connects the panels 23 and 24 together. It will be apparent that the shoe assembly 32 provides a substantial increase in the area of the bottom end of the leg 20 so that the unit pressure exerted by the leg on any underlying surface is materially reduced. The shoe assembly 32 is preferably somewhat longer than the leg 20 and the tab 36 may be of the same length as the leg 20, or shorter.

FIGURE 5 shows a modified construction in which the leg is made with panels 23 and 24 which are the same as in FIGURES 2 and 3. These panels are bent downwardly and their lower ends are brought together in the same way as already described, but a different kind of shoe assembly is used in FIGURE 5.

In this FIGURE 5 construction a shoe assembly 42 is made with other panels 43 and 44 which overlie the panels 23 and 24, respectively, and which preferably extend for some distance beyond the ends of these leg panels 23 and 24, as shown in FIGURE 1. These other panels 43 and 44 are connected together by a bridging portion 46 (FIGURE 5), of one-piece construction with the panels 43 and 44 and of sufficient width to bridge the space under the leg panels 23 and 24 when the leg is in set-up condition.

Upper edges 45 of the shoe assembly 42 are flush with the top surface of the pallet platform 16 and have their opposite ends extend into slots 47 (FIGURE 1) in the platform. This prevents spreading of the shoe assembly. For holding the shoe assembly in a fixed relation to the pallet platform and the leg, there are top tabs 48. These top tabs 48 are beyond the ends of the openings in the platform from which the leg panels 23 and 24 were displaced. It is necessary, therefore, to have openings 50 in the platform 16 for receiving the top tabs 48. The shoe assembly 42 can be made continuous across several legs and across the full length of the pallet, if desired.

When bringing the leg into set-up condition, as shown in FIGURE 5, the top tabs 46 and 48 are bent to bring them into horizontal positions overlying portions of the load-supporting area of the platform 16 so that the load on the platform will clamp the top tabs 48 against the surface of the platform and thus firmly hold the shoe assembly in position.

FIGURE 6 shows another modified construction in which a leg 56 is a different piece from the platform 16. This leg 56 has a center portion 57, and panels 58 and 59, all of which are preferably similar to the center portion 21 and panels 23 and 24 of FIGURES 2 and 3, except that no portion of the leg is made of material displaced from the platform 16. The center portion 57 of the leg 56 is attached to the platform 16 by staples 60 which are merely representative of fastening means for holding the center portion 57 in position against the bottom of the platform 16. FIGURE 6 shows the leg 56 without any shoe assembly at its lower end, but it will be understood that any of the shoe assemblies shown in the other figures can be used for the separate leg construction illustrated in FIGURE 6. The shoe may be omitted and the panels 56 and 59 stapled together.

FIGURE 7 shows another modified leg construction in which leg panels 73 and 74, which are displaced from the platform 16, are held together at their lower ends by a shoe assembly 76 formed of material extending from the ends of the panel 74. The material of this shoe assembly 76 is preferably crushed so as to bend more easily around the lower end of the leg. The shoe assembly 76 includes a panel portion 77 extending upwardly along the outside of the panel 73 and includes also a bridge portion 78 which extends across the bottom of the leg. The lower end of the leg is held together by fastening means consisting of adhesive 79 bonding the shoe assembly 76 to the panel 73. A staple can be substituted for the adhesive.

The shoe assembly 76 is of one-piece construction with the panel 74 and is displaced from the platform 16, the original positions of the different parts of the shoe assembly being indicated in dotted lines in FIGURE 1.

FIGURE 8 shows another modified construction with leg panels 83 and 84, preferably displaced from the platform, attached to a shoe assembly 86 that bridges the lower ends of the panels 83 and 84. The shoe assembly 86 has a flat bottom plate portion 87 attached to a channel 88 by a staple 89 or other fastening means.

The side walls of the channel 88 preferably converge at the same angle as the panels 83 and 84, and the channel is attached to the panels 83 and 84 by staples 90. These staples, by connecting both panels 83 and 84 to the common channel 88, also connect the panels to each other.

FIGURE 9 shows panels 93 and 94 connected with a shoe assembly 96 consisting of a channel having no bottom plate. The side walls of the shoe assembly 96 converge to fit against the panels 93 and 94, and are fastened to them by fastening means such as adhesive 97. The shoe assembly 96 has a bridge portion 98 which extends across the bottom of the leg. While the shoe assembly 96 of FIGURE 9, and the shoe assemblies 42 and 76 of FIGURES 5 and 7, respectively, increase the bottom area of the leg to some extent, they do not provide the large increase in area which is obtained from the shoe assemblies 32 and 86 of FIGURES 3 and 8, respectively.

FIGURE 10 shows another modified construction in which leg panels 103 and 104 fit into a channel of a shoe assembly 106. This shoe assembly includes a channel portion with outwardly extending flanges 108 for increasing the bearing area at the bottom of the shoe assembly 106. In the construction illustrated in FIGURE 10, the shoe assembly 106 is made of a single piece of relatively stiff material bent as shown to provide the sides of the channel and the flanges. This shoe assembly 106 is attached to the panels 103 and 104 by adhesive 110, or by other fastening means.

If required for additional bearing surface, the shoes shown in FIGURES 3, 5, 8, 9 and 10 can be made continuous across several legs or the full length of the pallet.

The platform of the pallet shown in the drawing may be made of corrugated paperboard, and for greater strength, when needed, a multi-ply, corrugated paperboard is used. The removal or crushing of material at the hinge lines, as at the regions 29 in FIGURE 2, makes it practical to use multi-ply, corrugated paperboard even though the board has considerable bulk. The invention is not limited to such material, and may also be made of solid fibreboard, plastic, metals, or other materials, resorting to corrugated constructions where great strength with light weight and low cost are desirable.

The shoe assemblies at the lower end of the legs can be made of the same kind of material as the legs, but are not necessarily made of such material, and since the shoe assemblies are subject to less strain, they are ordinarily made of thinner material than the platform and may be of single sheets even though the platform is made with a corrugated construction. It will be understood that score lines are employed in the material of the shoe assembly when necessary to obtain a sharp bend.

FIGURES 11 and 12 show another modified construction in which a platform 170 has panels 172 and 174 displaced from it with the panel 172 connected to the platform along a hinge line 176, and with the panel 174 connected to the panel 172 along a hinge line 178. At the free end of the panel 174 there are projections 180 which extend through slots 182 in the platform 170 when the leg is in set-up condition, as shown in FIGURE 12. The upper ends of these projections 180 are flush with the top surface of the platform 170, and other portions 184, of the top edge of the panel 174, bear against the bottom surface of the platform 170 between the slots 182.

There is another slot 186 in the platform 170; and a tab 188 extends through this other slot 186 and is bent downwardly across the top surface of the platform 170, as shown in FIGURE 12.

A number of modifications have been illustrated and described, but other changes and modifications can be made without departing from the invention as defined in the claims.

What is claimed is:

1. An industrial pallet comprising a platform, a leg supporting the platform and comprising two panels formed of material of the platform and connected together at their lower ends along a hinge region that forms a bottom portion of the leg for supporting the pallet from an underlying supporting surface, a first panel of the leg being connected at its upper end to the platform along a hinge line about which the leg swings from an undisplaced position into a downwardly extending set-up position, a second of the leg panels having a top edge with at least two longitudinally extending portions of the top edge extending above a lower portion of the top edge between them, one of the longitudinally-extending portions terminating at a distance above the lower portion not greater than the thickness of the platform and the other of said two longitudinally-extending portions being longer than the first one and having a tab bendable into a position parallel to the platform, the first panel of the leg extending downwardly at an obtuse angle to the undisplaced position of the leg, and the leg in set-up position being located entirely under a solid portion of the platform which is on the opposite side of the hinge line from the area of the platform from which the leg was displaced, said portion of the platform having an opening therein extending parallel to the hinge line but substantially shorter than the hinge line and in position to receive one of the longitudinally extending portions of the top edge of the leg, part of the solid portion of the platform beyond the end of the opening and intermediate the end limits of the hinge line being in position to bear on the lower portion of said top edge between said longitudinally extending portions.

2. The industrial pallet described in claim 1 and in which there is an opening in the platform on the opposite side of the hinge line from the undisplaced position of the leg and in position to receive the tab, and said tab extends across an area of the top surface of the platform.

3. The industrial pallet described in claim 1, and in which each of the legs includes also a shoe assembly at the lower end of the leg holding the lower ends of the panels in fixed relation to one another, the shoe assembly including an element extending across the bottom of the leg to increase the area of contact of the leg on an underlying surface, and the shoe assembly including also means connecting said element with the panels.

4. The industrial pallet described in claim 3, and in which the element extending across the bottom of the leg is a flat piece of material having a tab that extends upwardly along at least one of the panels, and the tab is connected to the panel, along which it extends, by said connecting means.

5. The industrial pallet described in claim 4, and in which the shoe assembly tab is of one-piece construction with the element of the shoe assembly that extends across the bottom of the leg and the shoe assembly tab is displaced from the material of said element and is hinged upwardly along a hinge line, and the connecting means include a common staple extending through the shoe assembly tab and both of the panels to hold the shoe assembly tab and the panels secured together.

6. The industrial pallet described in claim 4, and in which each shoe assembly has tabs extending upwardly along both of the panels of the leg and has a bridge portion on top of said flat piece of the shoe assembly and located between the tabs and connected to the tabs and extending under the lower ends of the panels of the leg.

7. The industrial pallet described in claim 6, and in which the tabs are other panels extending up the outside of the leg panels, and the connecting means are at the upper ends of the other panels for holding said other panels against the leg panels.

References Cited in the file of this patent

UNITED STATES PATENTS

| | | |
|---|---|---|
| 412,199 | McIlhenny | Oct. 1, 1889 |
| 1,334,409 | Sindelar | Mar. 23, 1920 |
| 1,508,898 | Smith | Sept. 16, 1924 |
| 2,240,024 | Stone | Apr. 29, 1941 |
| 2,744,713 | De Villers | May 8, 1956 |
| 2,903,220 | Pastor | Sept. 8, 1959 |
| 2,942,827 | Edson | June 28, 1960 |
| 2,970,797 | Desbois | Feb. 7, 1961 |
| 3,004,742 | Davidson | Oct. 17, 1961 |